United States Patent [19]

Nandi

[11] 4,426,504

[45] Jan. 17, 1984

[54] FLEXIBLE DICYCLOPENTENYL OXYETHYL METHACRYLATE CURABLE COMPOSITIONS

[75] Inventor: Uma S. Nandi, Columbus, Ohio

[73] Assignee: Battelle Development Corporation, Columbus, Ohio

[21] Appl. No.: 385,515

[22] Filed: Jun. 7, 1982

[51] Int. Cl.³ .......................................... C08F 220/28
[52] U.S. Cl. .................................... 526/282; 523/109; 523/115; 523/116; 524/32; 524/554; 526/217; 526/283
[58] Field of Search ............................... 526/283, 282

[56] References Cited

U.S. PATENT DOCUMENTS

| | | | |
|---|---|---|---|
| 2,414,089 | 1/1947 | Bruson | 260/410.5 |
| 3,642,750 | 2/1972 | Wegemund et al. | 526/283 |
| 4,097,677 | 6/1978 | Emmons et al. | 560/220 |
| 4,141,868 | 2/1979 | Emmons et al. | 260/23 AR |
| 4,145,503 | 3/1979 | Emmons et al. | 526/282 |
| 4,197,225 | 4/1980 | Emmons et al. | 260/23 AR |
| 4,261,872 | 4/1981 | Emmons et al. | 260/22 CB |
| 4,299,761 | 11/1981 | Emmons et al. | 260/42.53 |

FOREIGN PATENT DOCUMENTS

8202 2/1980 European Pat. Off. .

OTHER PUBLICATIONS

"Reactive Diluent QM-657," Technical Data Sheet, Rohm and Haas (1980).
"Recent Developments in Oxidative Polymerization," National Symposium on Polymers in the Service of Man, pp. 167–172 (Jun. 9–11, 1980).

*Primary Examiner*—Stanford M. Levin
*Attorney, Agent, or Firm*—Mueller and Smith

[57] ABSTRACT

Disclosed is an acrylic curable composition of improved flexibility that cures rapidly at room temperature in the presence of acrylic catalysts. The composition comprises between about 70% and 95% by weight dicyclopentenyl oxyethyl methacrylate and between about 5% and 30% of a linear polyalkylene glycol diacrylate or dimethacrylate cross-linking agent. Excellent flexibility and strength are achieved by use of the named cross-linking agents within the critical range set forth.

8 Claims, 4 Drawing Figures

FLEXIBLE DICYCLOPENTENYL OXYETHYL METHACRYLATE CURABLE COMPOSITIONS

BACKGROUND OF THE INVENTION

The present invention relates to acrylic curable compositions and more specifically to such compositions of improved flexibility based upon dicyclopentenyl oxyethyl methacrylate (hereinafter DOMA).

A variety of applications for acrylic curable compositions require formulations of low toxicity which are highly flexible, yet possess adequate hardness so that such compositions are practical for everyday use. Such applications include orthopedic castings, bone cement, dental applications, encapsulants, embedments, potting compositions, and the like. Toxicity restrictions are necessary so that safe handling of the acrylic compositions can be practiced at the manufacturing plant. Also, for medical and dental applications even more toxicity restrictions are placed on the compositions for efficacy in use. Another desirable attribute of such acrylic curable compositions is that they cure very rapidly, often in the absence of oxygen. Quick set-up and cure at room temperature protects the patient in medical applications and minimizes damage to electrical components when encapsulation of such components is practiced. Other applications require quick cure times at low temperatures as will be apparent to those skilled in the art.

Dicyclopentenyl oxyethyl methacrylate, or DOMA, is an unusual monomer containing acrylic unsaturation and non-aromatic ring unsaturation. Different curing systems can be employed using DOMA. For example, U.S. Pat. No. 3,642,750 proposes the use of various acrylic-substituted dicyclopentadienes as the basis for anaerobic adhesive compositions. More recently, Emmons in "Recent Developments in Oxidative Polymerization", preprints of papers presented at the National Symposium on Polymers in the Science of Man, pp 167–172 (June 9–11, 1980), proposes a variety of uses for acrylic compositions based on DOMA. Emmons notes that the oxyethyl linkage in DOMA provides a monomer which does not suffer from unacceptable noxious odors as did some of the acrylic-substituted dicyclopentadiene monomers in the past.

BROAD STATEMENT OF THE INVENTION

The present invention is directed to an acrylic curable coating composition of improved flexibility. Such composition comprises between about 70% and 95% by weight of DOMA and between about 5% and 30% by weight of a linear polyoxyalkyleneglycol diacrylate or dimethacrylate cross-linking agent. Poly(ethyleneglycol) acrylate and dimethacrylate cross-linking agents are preferred. The acrylic curable coating composition also contains conventional initiators and promoters for achieving rapid cure at room temperature.

Advantages of the present invention include the provision of extreme flexibility of the coating composition within a narrow critical range of cross-linking agent. Another advantage is that the composition is curable rapidly at room temperature. Another advantage is that the curable composition is designed to be very low in toxicity so that sensitive medical applications of the composition are possible. These and other advantages readily will become apparent based upon the disclosure contained herein.

Figure 1:
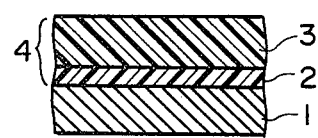
FIG. 1 is a scaled graph indicating the hardness obtained in a series of acrylic curable compositions as a function of the proportion of cross-linking agent contained in the compositions.

The drawings will be described more fully in the Examples which follow.

DETAILED DESCRIPTION OF THE INVENTION

Several critical restrictions on the novel acrylic curable composition were discovered during the course of research on the present invention. Initially, it must be remembered that the ultimate properties which the acrylic composition should possess include excellent flexibility with adequate hardness, rapid cure times at room temperature, and low toxicity of ingredients. Clearly, an unusual set of requirements were set forth for being achieved by the acrylic curable composition. Testing of various cross-linking agents for DOMA revealed that several classes of conventional multi-acrylic cross-linking agents were quite unsuitable for meeting the criteria set forth. Examples of cross-linking agents which provided compositions which either were too hard and rigid or too soft include trimethylol propane trimethacrylate, ethylene glycol diacrylate and dimethacrylate, pentaerythritol triacrylate, and hexanediol diacrylate. It will be observed that these multi-acrylate cross-linking agents are known to be quite advantageous in acrylic curable compositions; however, they were unsuitable for meeting the diverse criteria set forth for achieving according to the present invention. The class of multi-acrylic cross-linking agents which proved useful were linear poly(oxyalkylene) glycol diacrylates and dimethacrylates. The linearity of the cross-linking agents is believed important for minimizing application viscosity and contributing to the flexibility of the cured acrylic composition. The multiple ether linkages also are apparently important for providing flexibility to the cured composition. Fortuitously, the linear polyoxyalkylene glycol dimethacrylates of utility in the present invention generally have very low toxicity, expecially for medical applications which was a goal sought to be achieved.

Despite initial success in making flexible DOMA compositions using the linear polyoxyalkylene glycol diacrylate/dimethacrylate cross-linking agents, it was unexpectedly discovered that some formulations thereof failed to provide the flexibility sought. Further work revealed that a critical range of cross-linking agent should be maintained in order to achieve the unusual flexibility with the hardness desired. Moreover, as the examples and figures adequately will demonstrate, an unexpected, though dramatic, increase in flexibility is achieved within a narrow critical range of the cross-linking agent for the DOMA curable compositions of the present invention. Outside of this range, the compositions either are too cheesy to be useful or are hard and rigid tending to be brittle. Accordingly, the proportion of cross-linking agent should range from between about 5% and 30% by weight of the curable organic solids in the acrylic curable composition of the present invention and advantageously between about 10% and 20%. The proportion of DOMA, then, ranges from between about 70% and 95% by weight of the curable solids in the composition. Preferred cross-linking agents include polyoxyethyleneglycol diacrylates and methacrylates containing from 4 to about 33 oxyethylene groups per molecule.

Other ingredients for the DOMA curable composition of the present invention include conventional initiators such as, for example, benzoyl peroxide, di-tertiarybutyl peroxide, hydrogen peroxide, methyl ethyl ketone peroxide, and the like and mixtures thereof. Promoters or accelerators advantageously are included with the catalyst or initiators in conventional fashion. Suitable promoters or accelerators include, for example, dimethyl-para-toluidine, cobalt napthenate, cobalt octanate, dimethyl aniline, alkyl and aryl 1,10-phenantholines, 2,2-bipyridines, and the like. The initiators and promoters provide a rapid cure to the composition almost independently of the temperature as the composition will cure rapidly at temperatures from as low as $-30°$ C. to $100°$ C., though prevailing ambient room temperature is preferred. Also, the use of the initiator/promoter system in the composition provides the ability for the composition to be cured in the presence or absence of oxygen (eg. atmospheric oxygen).

Conventional inerts or fillers also can be included in the composition. These fillers are conventional and include, for example, silica, clays, talc, mica, and the like. Additionally, opacifying pigments such as titanium dioxide and the like also may be included in the composition. Further, tinctorial pigments may be useful on occasion also. These ingredients are inert and generally do not participate in the curing of the composition. Fortunately, the presence of such inert ingredients does not alter the preferred cross-linking agents nor the critical range of such cross-linking agents for providing the flexibility and hardness which the acrylic curable composition of the present invention possesses.

In practicing the present invention, the ingredients of the composition are admixed thoroughly, preferably in a mold or like container as rapid set times will be experienced. That is, generally only a few minutes are required for the composition to fully set up and develop remarkable initial hardness and flexural strength. Obviously, then, mixing of all ingredients only is made immediately prior to the time that curing is desired; otherwise, separation of DOMA and the cross-linking agent is preferred for long-term shelf stability and for transportation.

A wide variety of applications are eligible for the DOMA curable composition of the present invention. One excellent application for the composition is in orthopedic casting, bone cement, and dentistry. An exemplary formulation of such applications is set forth below:

| Ingredient | Proportion (wt %) |
| --- | --- |
| DOMA | 80–90 |
| Cross-Linker (eg, tetraethylene glycol dimethacrylate) | 10–20 |
| Initiator (eg. benzoyl peroxide, MEK peroxide) | 0.5–1.0 |
| Accelerator (eg. dimethyl-p-toluidine, cobalt napthenate) | 0.3–0.5 |
| Filler (eg. TiO$_2$, silica flour, cellulose fiber, glass wool) | Proportion dependent upon application |

Another prime use for the DOMA curable composition of the present invention is as an encapsulent, embedment, or potting compound. A representative formulation for such applications is set forth below:

| Ingredient | Proportion (wt %) |
| --- | --- |
| DOMA | 70–90 |
| Cross-Linker (eg. tetraethylene glycol diacrylate) | 10–30 |
| Initiator (eg. benzoyl peroxide) | 0.5–1.0 |
| Promoter (eg. dimethyl-p-toluidine, dimethyl aniline) | 0.3–0.5 |
| Plasticizer (eg. butyl phthalyl butyl glycolate) | Proportion dependent upon application |
| Filler (eg. silica) | Proportion dependent upon application |
| Wax (eg. carnuba wax) | Proportion dependent upon application |

Additional applications include sealants, caulking, impregnants, underwater curing systems, adhesives, bonding agents, and like uses.

As the foregoing representative formulations demonstrated, additional conventional ingredients also can be included in formulations of the DOMA curable composition of the present invention besides conventional fillers and pigments. These other ingredients are added depending upon the application. Moreover, it must be recognized that the addition of small proportions of other acrylic monomers may be desirable on occasion providing that the unusual properties achieved by the composition are not sacrificed to too great an extent. Again, the ultimate application normally will dictate the ultimate formulation to be used based upon the precepts of the present invention.

The following examples show in detail how the present invention can be practiced but should not be construed as limiting. In this application, all units are in the metric system, and all percentages and proportions are by weight, unless otherwise expressly indicated. Also, all references cited herein are expressly incorporated herein by reference.

IN THE EXAMPLES

EXAMPLE 1

A series of DOMA acrylic compositions were prepared and evaluated. Three different levels of benzoyl peroxide initiator and dimethyl-p-toluidine promoter were used. The proportion of tetra-ethylene glycol diacrylate cross-linker was varied for each of the three series of runs. Each cured panel (11.5 cm × 3 cm × 1.25 cm) was subject to hardness evaluation in accordance with ASTM D2240-75 and the results recorded as follows:

TABLE 1

| Cross-Linker (wt %) | Hardness (Shore D) | 1/Hardness ($10^{-3}$) |
| --- | --- | --- |
| Series A: 1.0% benzoyl peroxide/0.3% dimethyl-p-toluidine | | |
| 0 | 83 | 12.05 |
| 5 | 24 | 41.67 |
| 9 | 16 | 62.50 |
| 10 | 15 | 66.67 |
| 13 | 14 | 71.43 |
| 16 | 14 | 71.43 |
| 21 | 19 | 52.43 |
| 23 | 24 | 41.67 |
| 28 | 29 | 34.48 |
| 31 | 30 | 33.33 |
| Series B: 1.2% benzoyl peroxide/0.5% dimethyl-p-toluidine | | |
| 10 | 28 | 35.71 |
| 20 | 27 | 37.04 |
| 31 | 34 | 29.41 |
| 41 | 37 | 27.03 |
| 51 | 39 | 25.64 |
| Series C: 0.5% benzoyl peroxide/0.3% dimethyl-p-toluidine | | |
| 10 | 62 | 16.13 |
| 15 | 30 | 33.33 |
| 20 | 29 | 34.48 |
| 31 | 43 | 23.26 |
| 41 | 43 | 23.26 |

The above-tabulated results also are displayed graphically in FIG. 1 which plots the proportion of cross-linker versus the reciprocal of the resulting hardness. Initially, it will be noted that the proportion of initiator and promoter definitely affects the resulting hardness at all cross-linker levels. Despite this initiator/promoter effect, though, each series of formulations clearly shows a critical cross-linker range within which unexpectedly superior flexibility of each formulation results. This range is from about 5–30% cross-linker and is the basis for the present invention.

EXAMPLE 2

Another DOMA acrylic formulation series with varying tetra-ethylene glycol diacrylate cross-linker levels were made and the flexural strength of the cured samples measured in accordance with ASTM C78-75. This series used 1.2% benzoyl peroxide initiator and 0.4% dimethyl-p-toluidine promoter. The results obtained are set forth below.

TABLE 2

| Cross-linker (wt %) | Flexural Strength (kg/cm$^2$) |
| --- | --- |
| 0 | 50.33 |
| 10 | 63.97 |
| 15 | no break |
| 20 | no break |
| 31 | 41.13 |
| 41 | 41.48 |

Figure 2:
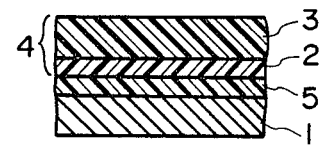
FIG. 2 is a scaled graph indicating the flexural strength possessed by several acrylic curable compositions as a function of the proportion of cross-linking agent contained in the curable compositions.

The above-tabulated results are displayed graphically in FIG. 2. Again, very unusual properties are seen within a critical range of cross-linker. Unexpected flexural strength in this range with good hardness and no brittleness makes the acrylic composition of the present invention specially adapted for many uses, eg. orthopedic casting, bone cement, etc.

EXAMPLE 3

The formulations in this series contained 70% by volume silica filler. Again, the proportion of cross-linker (basis curable component only) was varied and the resulting flexural strength determined. This series used 1.2% benzoyl peroxide initiator and 0.3% dimethyl-p-toluidine promoter to achieve the following results.

TABLE 3

| Cross-linker (wt %) | Flexural Strength (kg/cm$^2$) |
| --- | --- |
| 3 | 99.12 |
| 7 | 91.39 |
| 11 | 106.29 |
| 14 | 147.63 |
| 17 | 158.03 |
| 19 | 170.48 |
| 23 | 158.18 |
| 25 | 154.66 |

Figure 3:
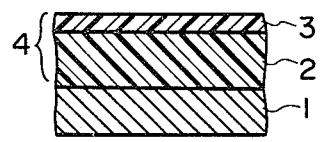
FIG. 3 is a scaled graph indicating the flexural strength of several silica-filled acrylic curable compositions as a function of the proportion of cross-linker in the filled curable compositions.

The above-tabulated results are displayed graphically in FIG. 3. Even for a silica filled system, the criticality of cross-linker levels is established.

EXAMPLE 4

The formulations in this series used varying amounts of polyethylene glycol dimethacrylate (11 oxyethylene groups) cross-linker with DOMA, 1% benzoyl peroxide initiator, and 0.5% dimethyl-p-toluidene promoter. The following results were obtained.

TABLE 4

| Cross-Linker wt.-% | Hardness (Shore D) | 1/Hardness ($10^{-3}$) |
| --- | --- | --- |
| 0 | 83 | 12.05 |
| 5 | 55 | 18.20 |
| 10 | 45 | 22.22 |
| 15 | 20 | 50.00 |
| 20 | 20 | 50.00 |
| 30 | 30 | 33.33 |
| 40 | 32 | 31.25 |
| 50 | 35 | 28.51 |

Figure 4:
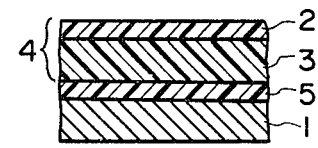
FIG. 4 is a scaled graph indicating the hardness obtained in a series of acrylic curable compositions as a function of the proportion of cross-linking agent in the compositions.
Figure 5:
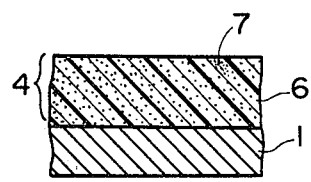
Figure 6:
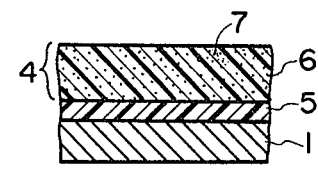

The above-tabulated results are displayed graphically in FIG. 4. Again, the unusual properties of the novel composition are seen within a critical range of cross-linker, even for a polymeric cross-linker.

EXAMPLE 5

Two formulations representative of orthopedic casting, bone cement, and dental applications of the DOMA acrylic system were made and evaluated as follows:

TABLE 5

| Ingredient | System 1 | System 2 |
| --- | --- | --- |
| DOMA | 40.0 ml | 40.0 ml |
| Tetra-ethylene glycol dimethacrylate | 10.0 ml | 10.0 ml |
| Benzoyl Peroxide | 0.5 g | 0.4 g |
| Dimethyl-p-toluidine | 0.3 ml | 0.3 ml |
| Silica Flour | — | 50.0 g |

System 1 was made by dissolving the benzoyl peroxide in DOMA to which was added the cross-linker and this mixture thoroughly mixed. The promoter then was added and quickly mixed. The resulting mixture cured to a solid matrix in 8 minutes and had a flexural strength of 186.72 kg/cm$^2$ and a Shore D hardness of 85.

System 2 as made by dissolving the benzoyl peroxide in DOMA. The silica flour then was mixed thoroughly therewith. The cross-linker and promoter were blended separately and the blend added to the silica flour mix with brisk stirring. The resulting mass cured in 8.5 minutes and had a flexural strength of 274.17 kg/cm$^2$.

EXAMPLE 6

Two formulations representative of encapsulent, embedment, and potting applications of the DOMA acrylic system were made and evaluated. Formulation 1 was made by dissolving 0.5 g of benzoyl peroxide in 42 ml of DOMA to which was added 8 ml of tetraethylene glycol diacrylate containing 0.2 ml of dimethyl-p-toluidine. The mixture was thoroughly mixed and then poured in a mold (4.5 cm diameter container) containing metal pieces. The mass cured in 4.5 minutes to a yellow-clear, flexible matrix.

Formulation 2 was made by dissolving 0.4 gm of benzoyl peroxide in 35 ml of DOMA to which was added 7 ml of tetraethylene glycol diacrylate having 0.3 ml of dimethyl-p-toluidine dissolved therein. The mixture was poured in the mold containing metal pieces for encapsulation. Within 3.5 minutes the mixture cured to a yellowish-clear, soft, highly flexible mass.

I claim:

1. An acrylic curable composition of improved flexibility that cures rapidly at room temperature in the presence of an acrylic catalyst, which comprises on a curable weight percent solids basis:
   (a) between about 70% and 95% dicyclopentenyl oxyethyl methacrylate, and
   (b) between about 5% and 30% of a linear poly(oxyalkylene) glycol diacrylate or dimethacrylate cross-linking agent which contains from between about 4 to about 33 oxyalkylene groups per molecule.

2. The composition of claim 1 wherein the proportion of said cross-linking agent is between about 10% and 20% on a curable solids basis.

3. The composition of claim 1 wherein said cross-linking agent is a polyoxyethylene glycol diacrylate or dimethacrylate.

4. The composition of claim 1 wherein said acrylic catalysts comprise a peroxy initiator and an accelerator.

5. The composition of claim 1 wherein said composition also contains particulate inert filler.

6. A method for rapidly curing an acrylic curable composition of improved flexibility which comprises blending an acrylic catalyst, between about 70% and 95% of dicyclopentenyl oxyethyl methacrylate, and between about 5 and 30% of a linear poly(oxyalkylene) glycol diacrylate or dimethylacrylate cross-linking agent which contains between about 4 and 33 oxyalkylene groups per molecule, said percentages being on a curable weight percent solids basis.

7. The method of claim 7 wherein said cross-linker is a poly(oxyethylene) glycol diacrylate or dimethacrylate.

8. The method of claim 6 wherein the proportion of cross-linker is between about 10% and 20% on a curable solids basis.

* * * * *